United States Patent [19]

Kashio

[11] 4,150,439

[45] Apr. 17, 1979

[54] IMPRESSION DATA-PROCESSING APPARATUS

[75] Inventor: Toshio Kashio, Tokyo, Japan

[73] Assignee: Casio Computer Co., Ltd., Tokyo, Japan

[21] Appl. No.: 843,519

[22] Filed: Oct. 19, 1977

[30] Foreign Application Priority Data

Oct. 20, 1976 [JP] Japan ................................ 51-125634
Oct. 20, 1976 [JP] Japan ................................ 51-125635

[51] Int. Cl.² .......................................... G06F 3/12
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,509,817 | 5/1970 | Sims, Jr. ........................... | 364/900 X |
| 3,991,405 | 11/1976 | Boyd et al. ........................ | 364/900 |
| 4,016,549 | 4/1977 | Hutner .............................. | 364/900 |
| 4,026,402 | 5/1977 | Byrd ................................. | 364/900 X |

*Primary Examiner*—Harvey E. Springborn
*Attorney, Agent, or Firm*—Flynn & Frishauf

[57] ABSTRACT

An impression data-processing apparatus, wherein a coded data denoting a numeral is formed of 4 bits; a coded data denoting a letter is formed of a combination of two 4-bit groups, that is, 8 bits; both forms of coded data are stored in a memory; the memory is further supplied with a space data indicating a space on a recording medium and a judgment data for distinguishing between a numerical data and a letter data, said space data and judgment data being constituted by two of those 4-bit codes included in sixteen codes formable from 4 bits which are not used to denote either a numerical data or letter data, and which comprises means for detecting the space data and judgment data in units of 4 bits; bit number read-controlling means for detecting he numerical data and letter data in units of 4 or 8 bits; and printing means for carrying out the spacing of a recording medium when the space code is detected by said space data-detecting means, and printing a numerical data or a letter data read out of the recording medium when a coded data denoting a numeral or letter is detected by said read-controlling means.

2 Claims, 12 Drawing Figures

F I G. 1C
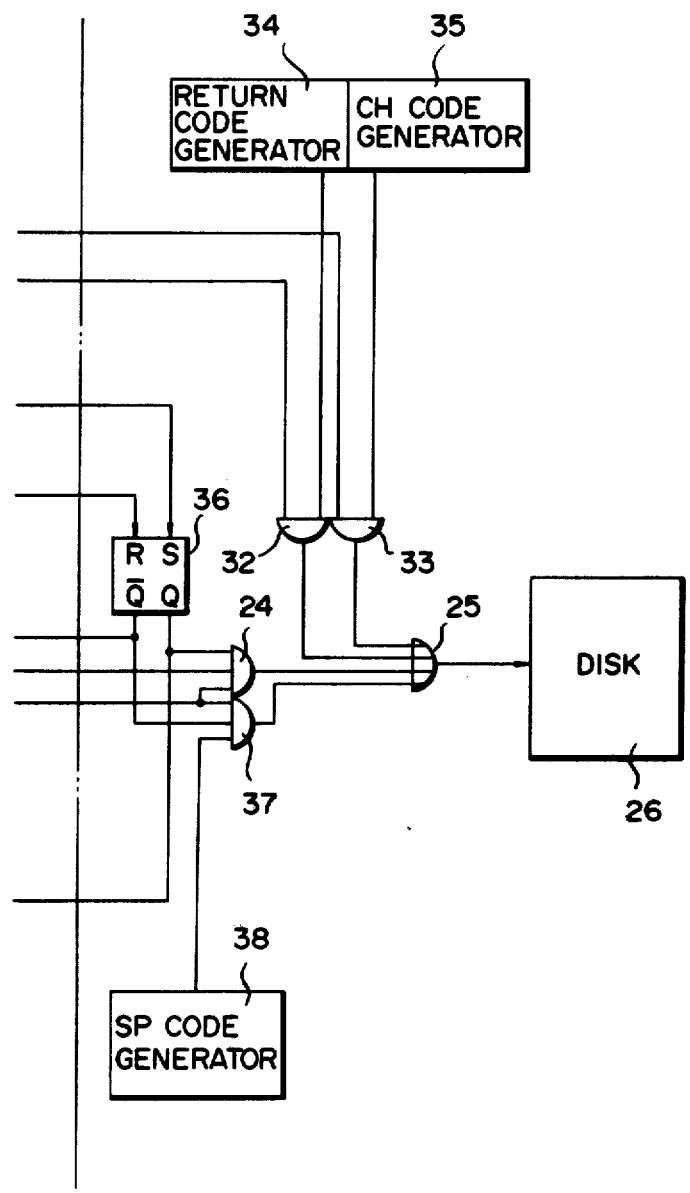

FIG. 2

| COLUMN | ① | ② | ③ | ④ | ⑤ | ⑥ | ⑦ |
|---|---|---|---|---|---|---|---|
| ▽ 7 DIGIT | ▽ 6 DIGIT | ▽ 4 DIGIT | ▽ 15 DIGIT | ▽ 6 DIGIT | ▽ 4 DIGIT ▽ | ▽ 10 DIGIT | |
| AREA | ARTICLE NUMBER | | ARTICLE | UNIT COST | QUANTITY | AMOUNT |
| ŌSAKA | 123 | 56 | RADIO | 5000 | 10 | 50000 |
| TŌKYO | 100 | 10 | TELEVI | 90000 | 5 | 450000 |
| KYOTO | 50 | 150 | ICEBOX | 50000 | 8 | 400000 |
| AKITA | 20 | 80 | ELECTR | 8000 | 10 | 80000 |

▽ ..... TAB POSITION

| Ō | S | A | K | A |  | 1 | 2 | 3 |  | 5 | 6 |  | R | A | D | I | O |
|---|---|---|---|---|---|---|---|---|---|---|---|---|---|---|---|---|---|
| d | d | d | d | sp | spch | sp | sp | sp | n | n | n | spsp | n | n | ch d d d d spsp |

UPPER LINE SHOWS A CONDITION OF BEING PRINTING OUTPUT DATA
LOWER LINE SHOWS PRINTING DATA STORED IN A MAGNETIC DISK MEMORY

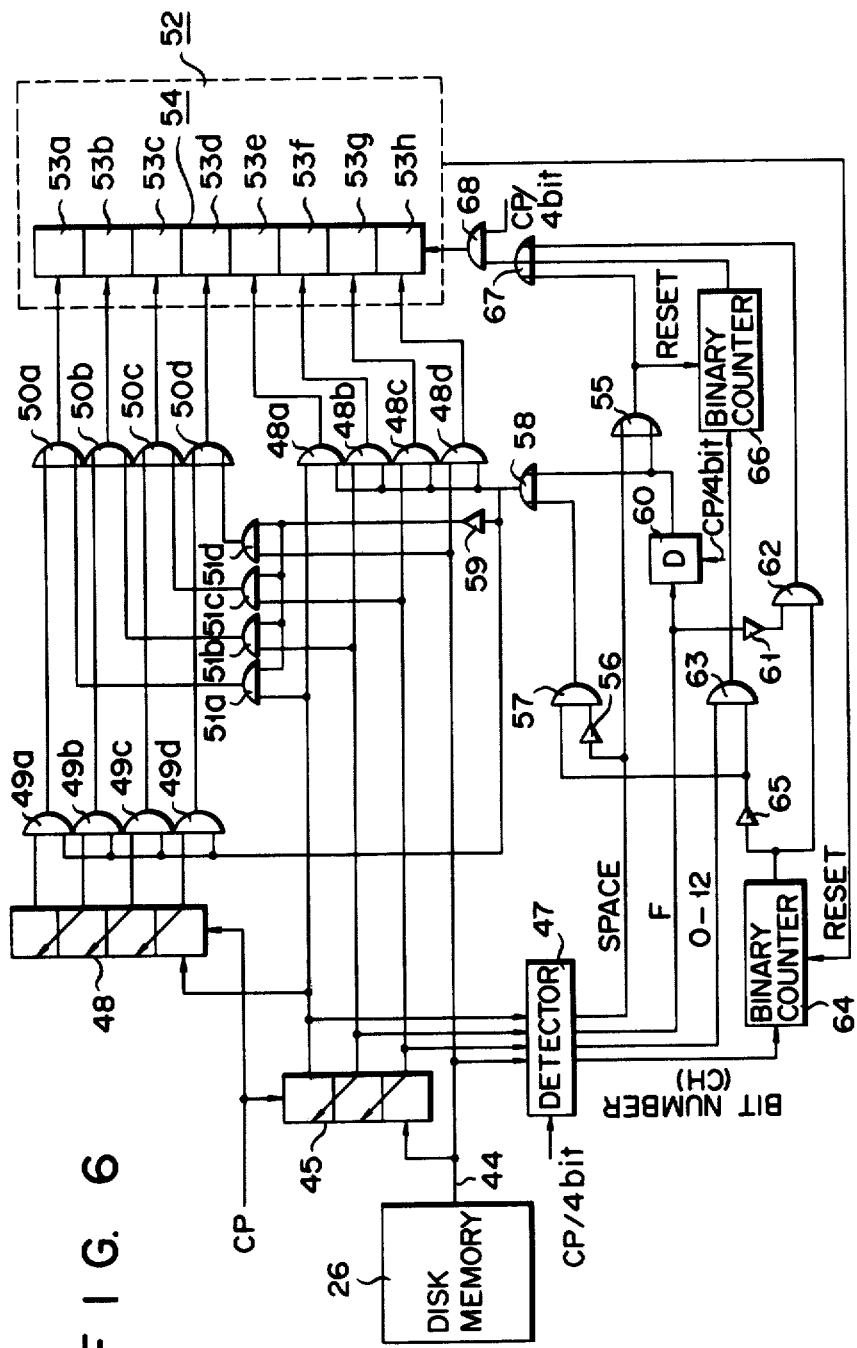
F I G. 6

F I G. 7
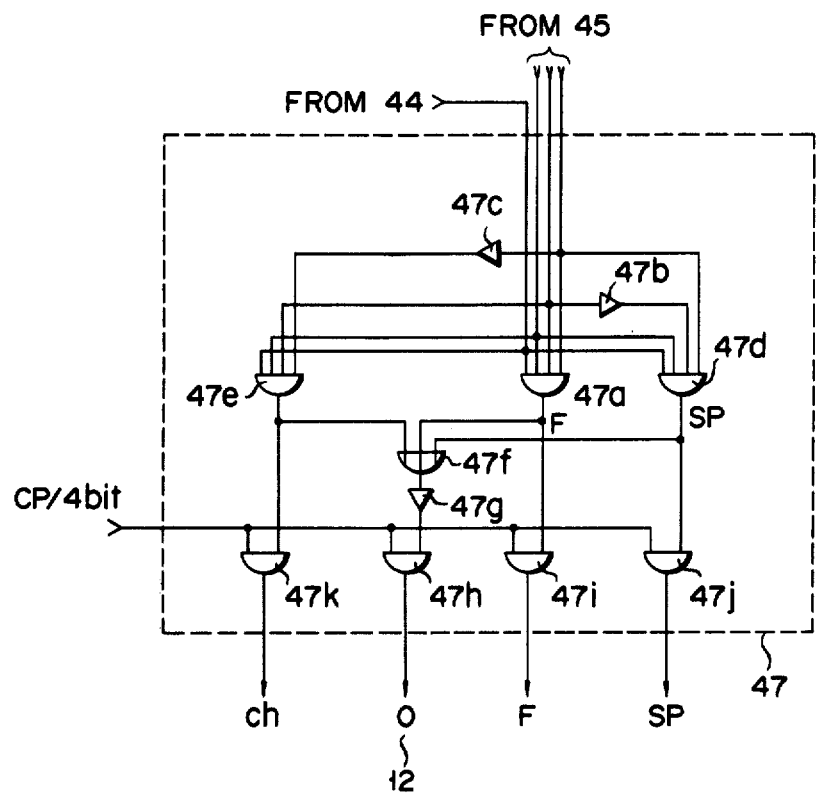

IMPRESSION DATA-PROCESSING APPARATUS

BACKGROUND OF THE INVENTION

This invention relates to an impression data-processing apparatus which reads out a 4-bit coded data denoting a numeral and an 8-bit coded data indicating a letter from a memory and later printing both forms of data.

Where data is processed, for example, by an electronic computer, the processed data is impressed, for example, by a line printer. An impression instruction is issued in the form specifying the prescribed column of a bill. An impression data supplied to a printing device is formed of a word data corresponding to each column and a space data for specifying the column. Where a memory is supplied with serially arranged words whose length is variable, then a space data is defined according to a maximum number of columns included in a bill and a number of numerals or letters constituting a word impressed in the respective columns.

There will now be described the manner in which data being impressed on a bill by a printing device are processed. Where an impression data is only formed of numerical data other related information, then one digit can be formed of 4 bits. Where, however, an impression data is formed of a letter, then it is impossible to represent the character by 4 bits. Generally, one character is formed of 8 bits. Actually where an impression data includes numerical data and letter data, not only letter data but also numerical data and other related information normally expressible by 4 bits are all denoted by 8 bits. Therefore, all impression data recorded in a disk or tape are formed of 8 bits. Where impression data are actually processed by an electronic computer, the letter is regarded to be formed of a combination of 4-bit units denoting numerals and can be processed, for example, by the CPU. Namely where an impression data is processed can be handled as information having 4 bits. "A character data of 8 bits" is simply an assumption to distinguish a letter from a numeral. In actual printing, it serves the purpose if a letter is handled in a unit of 8 bits. Data being actually impressed on a bill are mostly formed of space data, numerical data and other datas related to a numeral. At present, a disk, memory and tape include a considerable number of bits which should be prevented from being recorded. This condition noticeably decreases the recording capacity of such recording media.

SUMMARY OF THE INVENTION

This invention has been accomplished in view of the above-mentioned circumstances, and is intended to provide an impression data-processing apparatus, wherein a numerical data, and space data are denoted by a 4-bit code; a letter data is formed of a combination of two 4-bit codes; a memory is supplied with not only the numerical data and space data but also a data for distinguishing between the numerical data and letter data; and an impression data can be printed simply by detecting said impression data in a unit of 4 bits or 8 bits.

To this end, there is provided an impression data-processing apparatus designed to read out from a memory coded data denoting numerals from 0 to 9, notations related thereto and letters which are later to be recorded in a recording medium and print coded data by a printing device, wherein the memory device is supplied with a numerical data denoted by a 4-bit code, letter represented by a combination of two 4-bit units and further with a space data for specifying a space on the recording medium and a judgment data for distinguishing between a numerical data and letter data, said space data and judgment data being constituted by two of those 4-bit codes included in sixteen codes formable from 4 bits which are not used to denote either a numerical data or letter data, and which comprises means for reading said data from the memory device; means for detecting in a unit of 4 bits the space data and judgment data read out by the reading means; bit number read-controlling means for detecting in a unit of 4 or 8 bits coded data denoting a numeral or letter read out of the memory by the reading means according to the judgment data detected by the detection means; and printing means for carrying out the spacing of the recording medium when a code representing the space data is detected by the detection means, and printing a numeral or letter recorded in the recording medium when a code denoting a numeral or letter is detected by the read-controlling means.

With the impression data-processing apparatus of this invention, a numerical data is formed of 4 bits and a letter data is formed of 8 bits and the space data is formed of 4 bits. Their data are drawn out as read out instructions. Therefore, this invention enables a memory to be supplied with a far smaller number of bits than when all impression data stored in said memory are formed of 8 bits, thus assuring the very efficient use of the limited storing capacity of the memory.

BRIEF DESCRIPTION OF THE DRAWINGS

FIGS. 1A–1C constitute a block diagram of a circuit according to one embodiment of this invention for causing a memory to be supplied with an impression data;

FIG. 2 illustrates a bill format used in the description of the circuit of FIG. 1;

FIG. 6 sets forth the arrangement of a circuit for reading out an impression data stored in a memory by the embodiment of FIG. 1;

FIG. 7 shows a coded data-detecting circuit included in FIG. 6; and

DETAILED DESCRIPTION

There will now be described by reference to the appended drawings an impression data-processing apparatus according to the preferred embodiments. Description is first given of the manner in which an impression data used in the invention is coded. Basically, a character data is coded by 4 bits. Among sixteen coded data weighted by 4-bit codes, thirteen coded data are used to denote numerals from 0 to 9 and notations such as ".", ",", "—" and ",". The remaining codes 13, 14, 15 represent special control instructions regarding spacing SP, bit number Specification Ch and function F. Any two of the above-mentioned thirteen codes are combined to indicate letters such as A, B, C each having 8 bits. The function code F instructs a printing device to be returned for printing on a new column. In this case, the 4-bit function code F is combined with any of the above-mentioned 4-bit digit code to provide an 8-bit instruction. The mode of coding is presented in Table 1 below.

Table 1

| Data | Weight | Code | Remarks |
|------|--------|------|---------|
| 0 | 0 | 0000 | |
| 1 | 1 | 0001 | |
| 2 | 2 | 0010 | |
| 3 | 3 | 0011 | |
| 4 | 4 | 0100 | |
| 5 | 5 | 0101 | |
| 6 | 6 | 0110 | Any two of these 4-bit |
| 7 | 7 | 0111 | codes are combined to denote |
| 8 | 8 | 1000 | an 8-bit character |
| 9 | 9 | 1001 | |
| . | 10 | 1010 | |
| - | 11 | 1011 | |
| , | 12 | 1100 | |
| SP | 13 | 1101 | Spacing |
| Ch | 14 | 1110 | Specification of a bit number |
| F | 15 | 1111 | Combined with another 4-bit code |

An impression data is processed by a 4-bit numerical data and an 8-bit letter data. The impression data thus processed is stored in a memory to get ready for printing.

Figure 1A:
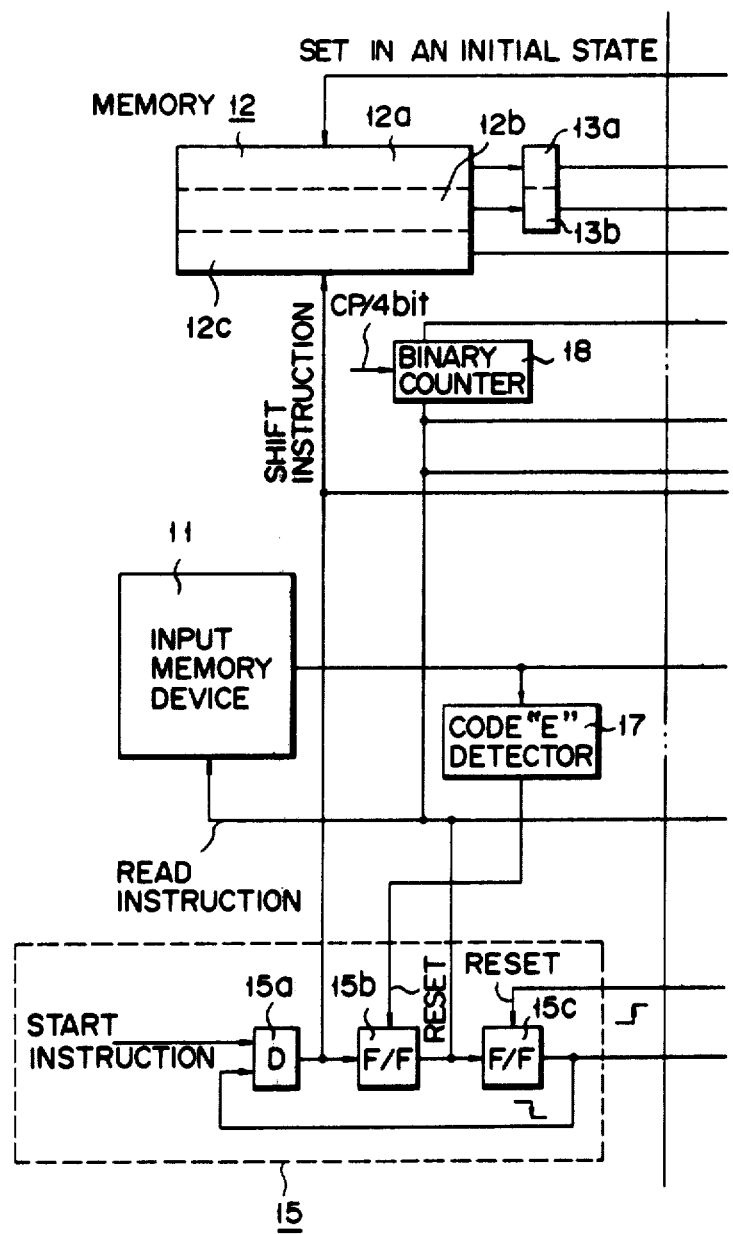
Figure 1B:
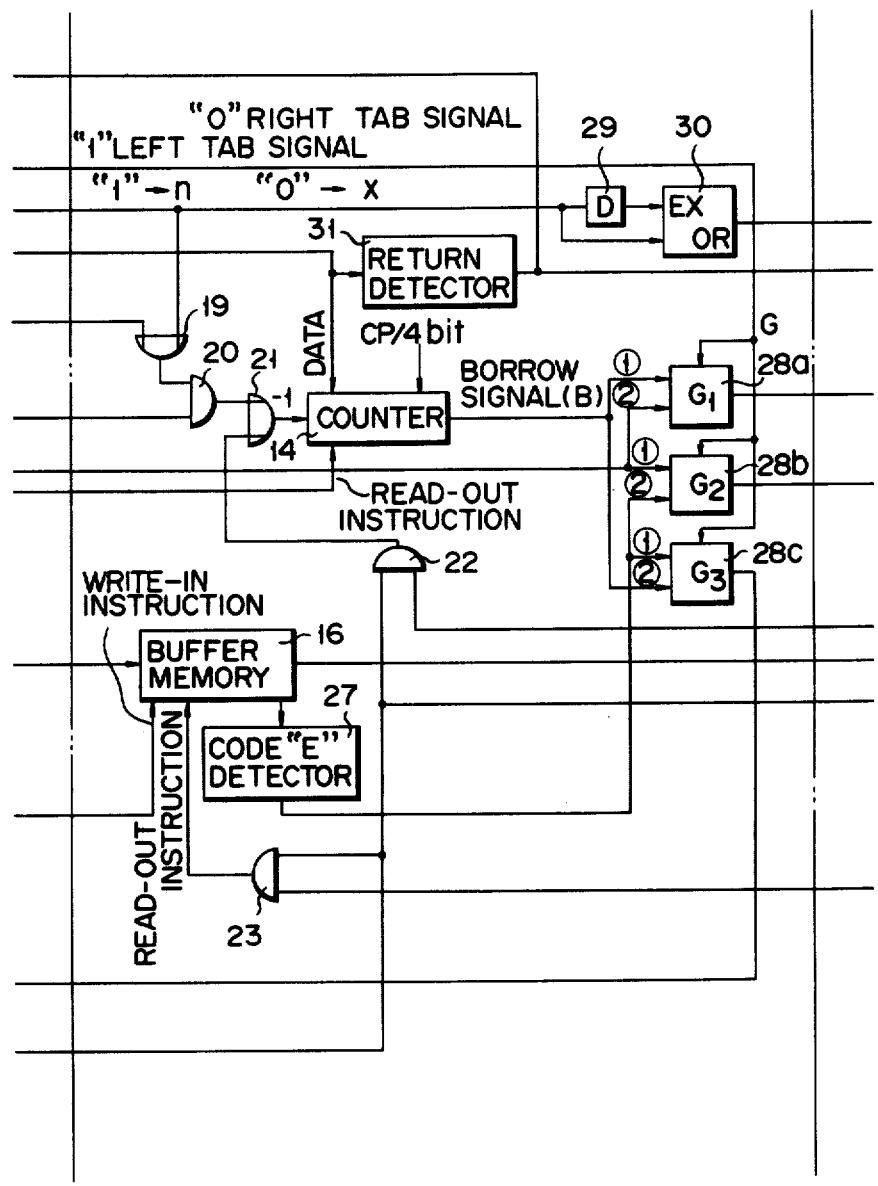

FIGS. 1A–1C constitute a block diagram of a circuit for causing an input memory 11 to be supplied with a coded impression data including a coded space data. The input memory 11 stores serially arranged word data of variable length corresponding to the respective columns with proper positioning codes inserted between said word data. Where word data are to be printed, as shown in FIG. 2, in the respective columns of a bill, the memory is previously supplied with one record data corresponding to one line which is formed of a series of word data. Referring to FIG. 2, the input memory 11 is supplied with, for example, the following record data formed of closely arranged word data of variable length: OSAKA $\boxed{E}$ 100 $\boxed{E}$ 56 $\boxed{E}$ RADIO $\boxed{E}$ 5000 $\boxed{E}$ 10 $\boxed{E}$ 50000 $\boxed{E}$ TOKYO $\boxed{E}$ ... ($\boxed{E}$ is a word-positioning code lying between every adjacent word data).

Under the storing condition indicated by the above illustration, the respective word data are stored in the input memory 11 in a closely arranged form without allowing space codes. In FIG. 2, a bill has seven columns from (1) to (7), which respectively have lengths corresponding to maximum numbers of digits positions as 7, 6, 4, 15, 6, 4 and 10. A notation ∇ denotes a tab position.

The impression data-processing apparatus of this invention further comprises an impression-controlling data memory 12 corresponding to the input memory 11. This memory 12 comprises first to third shift memory units 12a, 12b, 12c in which stored data are shifted in parallel to be read out for each digit position. The shift memory unit 12a is supplied with an impression position instruction to determine whether a digit data, for example, should be impressed close to the right end of a column (right tab) or a character data, for example, should be impressed close to the left end of a column (left tab). The shift memory unit 12a stores the right tab instruction in the form of a binary code "1", and the left tab instruction in the form of a binary code "0". With respect to FIG. 2, the shift memory unit 12a is supplied with tab instructions denoted by serially arranged binary codes as "0", "1", "1", "0", "1", "1" and "1" in accordance with the serial order of the columns of a bill. The second shift memory unit 12b is supplied with judgment data for determining whether a data impressed on each column denotes a numerical data (n) or a letter data (a). The numerical data is represented by a binary code "1", and the letter data is denoted by a binary code "0". Referring to FIG. 2, therefore, the shift memory unit 12b stores data indicated by a series of binary codes, as "0", "1", "1", "0", "1", "1" and "1". The third shift memory unit 12c is supplied with maximum numbers of digit positions of the respective columns. Referring to FIG. 2, said third shift memory unit 12c stores data denoting said maximum numbers of digit positions as 7, 6, 4, 15, 6, 4 and 10. Upon receipt of a shift instruction, the shift memory units 12a, 12b supply the corresponding memory elements 13a, 13b with a data denoting a tab occupying the foremost position of the stored data. Further, the aforesaid shift instruction and a data denoting a maximum number of digit positions of each bill column are supplied as a preset data to a counter 14 which receives a read instruction. The counter 14 stores a number thus counted.

The operation of the input memory 11 and control data memory 12 is controlled by a control circuit 15 supplied with a pulse start instruction. The control circuit 15 comprises a delay circuit 15a which receives said pulse start instruction. An output signal from the delay circuit 15a is supplied as a shift instruction to the control data memory 12 to read out a data occupying the foremost digit position of said memory 12, and also as a read instruction to the counter 14. An output signal from the delay circuit 15a sets a first flip-flop circuit 15b of the control circuit 15. A set output signal from the first flip-flop circuit 15b is supplied as a read instruction to the input memory 11, and also as a write-in instruction to a buffer memory 16 which receives a data read out of the input memory 11. When a code detection circuit 17 detects a word-positioning code E while a data is read out of the input memory 11, then the first flip-flop circuit 15b is reset. A signal which falls when the first flip-flop circuit 15b is reset, sets a second flip-flop circuit 15c. When a signal falling at the reset of the second flip-flop circuit 15c is detected, the delay circuit 15 receives a signal.

A set output signal from the first flip-flop circuit 15b is supplied as a counting instruction to a binary counter 18. When the binary counter 18 counts four clock pulses CP, namely, when a counting instruction is given for every 4 bits, then the data stored in said counter 18 is reversed in respect of the binary code. An output signal from the binary counter 18 is conducted to an OR circuit 19, together with an output signal from the memory element 13b which stores a numerical data (n) or a letter data (a). An output signal from the OR circuit 19 is delivered to an AND circuit 20, together with an output signal from the first flip-flop circuit 15b. An output signal from the AND circuit 20 is supplied to the counter 14 through an OR circuit 21 as an instruction to subtract one from the data stored in said counter 14. Namely, said counter 14 carries out down-counting, each time four clock pulses are received.

A set output signal from the second flip-flop circuit 15c is sent forth to the OR circuit 21 through an AND circuit 22, and also as a read instruction to the buffer memory 16 through an AND circuit 23. A data read out of the buffer memory 16 is stored in a magnetic disk memory which receives an impression data conforming to a bill format.

A word-positioning code (E)-detecting circuit 27 is provided at the output digit position of the buffer memory 16 to detect the end of a data read out of the buffer memory 16.

A right tab data "1" or left tab data "0" stored in the memory unit 15a included in the control data memory 12 is supplied as a gate signal G to first to third gate circuits 28a to 28c. An output from the memory element 13b supplied with a numerical data "1" or a letter data "0" is conducted an exclusive OR circuit 30 directly or through a delay circuit 29. The exclusive OR circuit 30 sends forth an output signal when the contents stored in the memory element 13b has its binary code reversed from "0" to "1" or from "1" to "0". The third memory unit 12c of the control data memory 12 is supplied with data denoting the maximum numbers of digit positions of the respective bill columns. The digit position of said memory 12 immediately following the last column of one record data is supplied with a return instruction. This return instruction is detected by a return instruction-detecting circuit 31. At this time, the control data memory 12 receives an instruction for a return to the original condition. Output signals from the return instruction-detecting circuit 31 and exclusive OR circuit 30 are supplied as gate signals to AND circuits 32, 33 respectively. These AND circuits 32, 33 are each supplied with a return code issued from a return code generator 34 and a bit number-changing code Ch delivered from a bit number-changing code generator 35. Output code signals from the AND circuits 32, 33 are sent forth to a magnetic disk memory through an OR circuit 25.

Figures 3, 4:
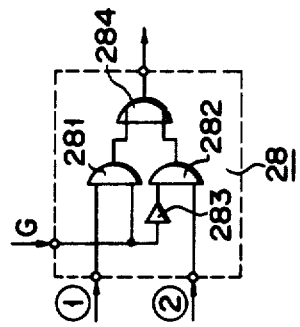
FIG. 3 shows a gate circuit included in FIG. 1.
FIG. 4 indicates the manner in which impression data are actually printed on a bill, and the corresponding impression data stored in a magnetic disk memory.

The gate circuits 28a to 28c are each arranged as shown in FIG. 3. The gate circuits 28a to 28c are supplied with not only a gate signal G but also input signals (1), (2). The input signals (1), (2) are brought to one of the input terminals of AND circuits 281, 282 respectively. A gate signal is directly conducted to the AND circuit 281. A gate signal is carried to the AND circuit 282 through an inverter 283. As the result, the gates of the AND circuits 281, 282 are reversely operated. Output signals from said AND circuits 281, 282 are led out through an OR circuit 284.

The input terminals (1), (2) of each of the first and third gate circuits 28a, 28c are supplied with a borrow signal β when the contents of the counter 14 are reduced to zero. The input terminals (1), (2) of each of the first and second gate circuits 28a, 28b are supplied with a set output from the first flip-flop circuit 15b. The input terminals (1), (2) of each of the second and third gate circuits 28b, 28c are supplied with a signal denoting the detection of a word-positioning code E which is sent forth from the code-detecting circuit 27.

An output signal from the first gate circuit 28a is conducted as a set signal to a flip-flop circuit 36, which is reset by an output signal from the second gate circuit 28b. A set output signal from the flip-flop circuit 36 is supplied as a gate signal to the AND circuits 23, 24. A reset output signal from said flip-flop circuit 36 is delivered as a gate signal to the AND circuits 22, 37. The AND circuit 37 is supplied with a set output signal from the second flip-flop circuit 15c and also with a space code SP issued from a space code generator 38.

A space code SP sent forth through the AND circuit 37 is carried to a magnetic disk memory through the OR circuit 25.

As mentioned above, the input memory 11 is supplied with a series of word data corresponding to the respective bill columns in the form of 4 bits and a series of letter data in the form of 8 bits. The data control memory 12 is supplied with a right tab data or left tab data, a judgment data for distinguishing between a numerical data and letter data, and the maximum numbers of digit positions of the respective bill columns in conformity to the serial order of said columns.

Where, under the above-mentioned condition, a start instruction is given to the control circuit 15, then the delay circuit 15a sends forth an output signal. A shift instruction is issued to the control data memory 12. As the result, the left tab data "0" and character data "0" stored in the foremost digit position of the control data memory 12 which correspond to the first column (1) of FIG. 2 and a data denoting a maximum number of digit positions of a given column are read out of said control data memory 12. The left tab data "0" and letter data "0" are supplied to the memory elements 13a, 13b respectively. A data denoting the maximum number of digit positions of said column is present in the counter 14.

An output signal from the delay circuit 15a sets the first flip-flop circuit 15b. A read instruction is given to the input memory 11, and a write instruction is issued to the buffer memory 16. As the result, the foremost word data "OSAKA" stored in the input memory 11 is read out to be written in the buffer memory 16 in the serial order. At this time, a gate signal is supplied to the AND circuit 20 and a counting instruction is issued to the binary counter 18. When the binary counter 18 gives forth an output signal "1", the OR circuit 19 produces an output signal. The binary code of a data stored in the binary counter 18 is reversed by a clock pulse every four clock pulses are received. Namely, the AND circuit 20 issues an output signal for every four bits. Eventually, the counter 14 carries out downcounting for every eight bits.

At this time, a letter data of 8 bits is read out from the foremost column (1) of the input memory 11. Therefore, the counter 14 carries out down-counting to the extent corresponding to, for example, five letters (FIG. 2) read out of the input memory 11. Since the maximum number 7 of digit positions of the foremost column (1) is preset in the counter 14, one is subtracted from said number 7, each time one of said five letter data is read out. Upon completion of the reading of the word of the foremost column (1), the corresponding word-positioning code E is read out. When the code-detecting circuit 17 detects said word-positioning code 17, the first flip-flop circuit 15b is reset. As the result, reading from the input memory 11 and writing in the buffer memory 16 are brought to an end. The word data "OSAKA" of the foremost column (1) read out of the input memory 11 is stored in the buffer memory 16. The counter 14 counts two digit positions left vacant when the five letters "OSAKA" of the foremost column (1) having seven digit positions are impressed on a bill.

When the first flip-flop circuit 15b is reset, then the second flip-flop circuit 15c is set. A gate signal is supplied to the AND circuits 22, 23, 24, 37. Since the data of the foremost column (1) is of the letter type (a) and is subjected to the left tab arrangement, the contents of the memory element 13a are cleared and a gate signal G is not supplied to the gate circuits 28a to 28c. Accordingly, a signal already supplied to the input terminal (2) of each of said gate circuits 28a to 28c is sent forth.

When, therefore, the first flip-flop circuit 15b is set, the first gate circuit 28a generates an output signal to set the flip-flop circuit 36. When the second flip-flop circuit 15c is set, the buffer memory 16 is supplied with a read instruction, and the gate of the AND circuit 24 is opened. Accordingly, the word data "OSAKA" stored in the buffer memory 16 is read out and written in the magnetic disk memory 26 through the OR circuit 25. Upon completion of the reading of the word data "OSAKA" from the buffer memory 16, the code-detecting circuit 27 detects the corresponding word-positioning code E. At this time, the second gate circuit 28b produces an output signal which in turn resets the flip-flop circuit 36. When the flip-flop circuit 36 is reset, the gate of the AND circuit 37 and that of the AND circuit 22 are opened. As the result, the counter 14 carries out down-counting, each time four bits are received through the OR circuit 21. A 4-bit space code delivered from the space code generator 38 is recorded in the magnetic disk memory 26. At this time, the contents of the counter 14 representing the remaining empty digit positions of the foremost column (1) are cleared. When the third gate circuit 28c sends forth an output signal upon receipt of a borrow signal β, then the second flip-flop circuit 15c of the control circuit 15 is reset. The word data "OSAKA" of the foremost column (1) is written in the magnetic disk memory 26 in the form ready for impression on a bill.

In this case, the word data being written in the foremost column (1) is of the letter type (α) and is subjected to the left tab arrangement. Since said word data of the letter type α has five letters, and the foremost column (1) has a maximum of seven digit positions, the foremost column (1) is expressed as follows when recorded in the magnetic disk memory 26:

αααααSPSP

This format is used as an instruction for a printing device such as a line printer to impress information corresponding to the foremost column (1).

When the second flip-flop circuit 15c is reset, a signal is supplied to the delay circuit 15a, an output signal from which is sent forth as a shift instruction to the impression-controlling data memory 12. When the first flip-flop circuit 15b is thus set, the word data of the digit type (n) of the second column (2) is ready to be recorded in the magnetic disk memory 26. Where the impression position of, for example, a word data of the digit type (n) is subjected to the right tab arrangement, then the memory elements 13a, 13b are supplied with a data of "1". Where the second column (2) has a maximum of, for example, six digit positions, then a count of "6" is preset in the counter 14. A digit data formed of three digits, for example, "123" (FIG. 2) which is read out of the input memory 11 to be impressed in the second column (2) is previously written in the buffer memory 16. When the writing of the word data of the digit type (n) belonging to the second column (2) is brought to an end, then the first flip-flop circuit 15b is reset, and the second flip-flop circuit 15c is set as in the preceding case.

Since, at this time, the memory elements 13a, 13b are supplied with a data of "1", the second and third gate circuits 28b, 28c receive a gate signal of "1". When the binary code of the contents of the memory element 13b is changed from "0" to "1", the exclusive OR circuit 30 issues an output signal. Upon receipt of this signal, the gate of the AND circuit 33 is opened, causing a bit number change-instructing code Ch from the changed code generator 35 to be recorded in the magnetic disk memory 26. Namely, the magnetic disk memory 26 is supplied with said bit number change-instructing code Ch of 4 bits in succession to the preceding word data of the letter type (α) belonging to the foremost column (1). Since, at this time, a gate signal of "1" is supplied to the second gate circuit 28b, the flip-flop circuit 36 is reset, with the first flip-flop circuit 15b still remaining in a set position. Accordingly, a gate signal is supplied to the AND circuits 22, 37.

As mentioned above, the word data of the second column (2) is formed of three digits "123" (FIG. 2). While, therefore, the first flip-flop circuit 15b is set, a down-count instruction is given to the counter 14 through the AND circuit 21 whose gate is opened upon receipt of a data of "1" from the second memory element 13b. The counter 14 carries out down-counting, each time four bits are received in synchronization with the reading of the respective digits of the word data of the second column (2) from the input memory 11. Thus, the counter 14 counts the number of the remaining empty digit positions of the second column (2).

Where the second flip-flop circuit 15c is set, the gates of the AND circuits 22, 37 are opened. The counter 14 carries out down-counting, each time four bits are received. A 4-bit space code SP delivered from the space code generator 38 is recorded in the magnetic disk memory 26. When the contents of the counter 14 are cleared, a borrow signal β is generated. Space codes SP corresponding to the number of the remaining vacant digit positions of the second column (2) which have been counted by the counter 14 are written in the magnetic disk memory 26. At this time, the gate circuit 28a sends forth an output, which in turn sets the flip-flop circuit 36. When this flip-flop circuit 36 is set, the gates of the AND circuits 23, 24 are opened, and a read instruction is issued to the buffer memory 16. Accordingly, the word data of the digit type (n) belonging to the second column (2) is read out of the buffer memory 16 to be written in the magnetic disk memory 26. Upon completion of said writing, the code-detecting circuit 27 detects a word-positioning code E, which in turn resets the second flip-flop circuit 15c through the third gate circuit 28c. The magnetic disk memory 26 is supplied with the word data of the letter type (α) belonging to the foremost column (1) and the word data of the letter type (n) belonging to the second column (2) in the form of the following format:

αααααSPSPChSPSPSPnnn

Namely, the magnetic disk memory 26 stores the five letters "OSAKA" of the foremost column (1) each denoted by 8 bits and collectively subjected to the left tab arrangement and the three digits "123" of the second column (2) each represented by 4 bits and collectively subjected to the right tab arrangement just in the form ready for impression.

Later, the word data of the third and following columns (3), (4), (5), (6), (7) are read out of the input memory 11 according to the serial order of said columns. The magnetic disk memory 26 is supplied with a record data formed of the data of the respective columns belonging to one line of a bill in the above-mentioned impression format which indicates the letter data and digit data, the maximum numbers of digit positions of the respective columns, with a bit number change-instructing code Ch inserted, each time the number of bits is changed from one column to another. FIG. 4 illustrates the actual impression on a bill and the form in which said impression is stored in the magnetic disk memory 26. When read out of the magnetic disk memory 26 with the bit number change-instructing code Ch used to distinguish between the word data of the adjacent columns, then an impression data stored in said magnetic disk memory 26 can be used intact as the form ready for impression on a bill with required spaces provided for the vacant digit positions.

When the writing of one record data in the magnetic disk memory 26 is brought to an end, the impression-controlling data memory 12 issues a return instruction code upon receipt of the succeeding shift instruction. The return instruction code is detected by the code-detecting circuit 31. The detection signal is supplied to the AND circuit 32, and the return instruction code generator 34 sends forth an output, which in turn is recorded in the magnetic disk memory 26. The return instruction code read out of said memory 26 is supplied as an instruction for the printing device to make a return. A return instruction code detection signal from the code-detecting circuit 31 brings the impression-controlling data memory 12 to a condition ready to be stored with control data for impression of the word data of the succeeding line. Namely, said impression-controlling data memory 12 is supplied with the left or right tab data, judgment data to distinguish between a digit data and letter data and a data on a maximum number of digit positions all relative to the foremost column of the succeeding line. All the above-mentioned data are read out from said impression-controlling data memory 12 and the word data of the succeeding line are read out of the input memory 11. Thus, the magnetic disk memory 26 records all information read out of said memories 12, 11.

In the foregoing embodiment, a bit number change-instruction code Ch was inserted in an impression data, each time a change occurred from the 4 bits of a numerical data to the 8 bits of a letter data or vice versa. In practice, however, it it possible to utilize a space code preceding a digit data or letter data to indicate a number of 4 or 8 bits constituting either the digit data or the letter data. A digit data is impressed on a bill by being subjected to the right tab arrangement as previous described. In this case, a space code SP, if any, immediately preceding the foremost digit of a digit data of a given column is converted into a new space code SP' to process the following digits belonging to said column in a unit of 4 bits.

Figure 5A:
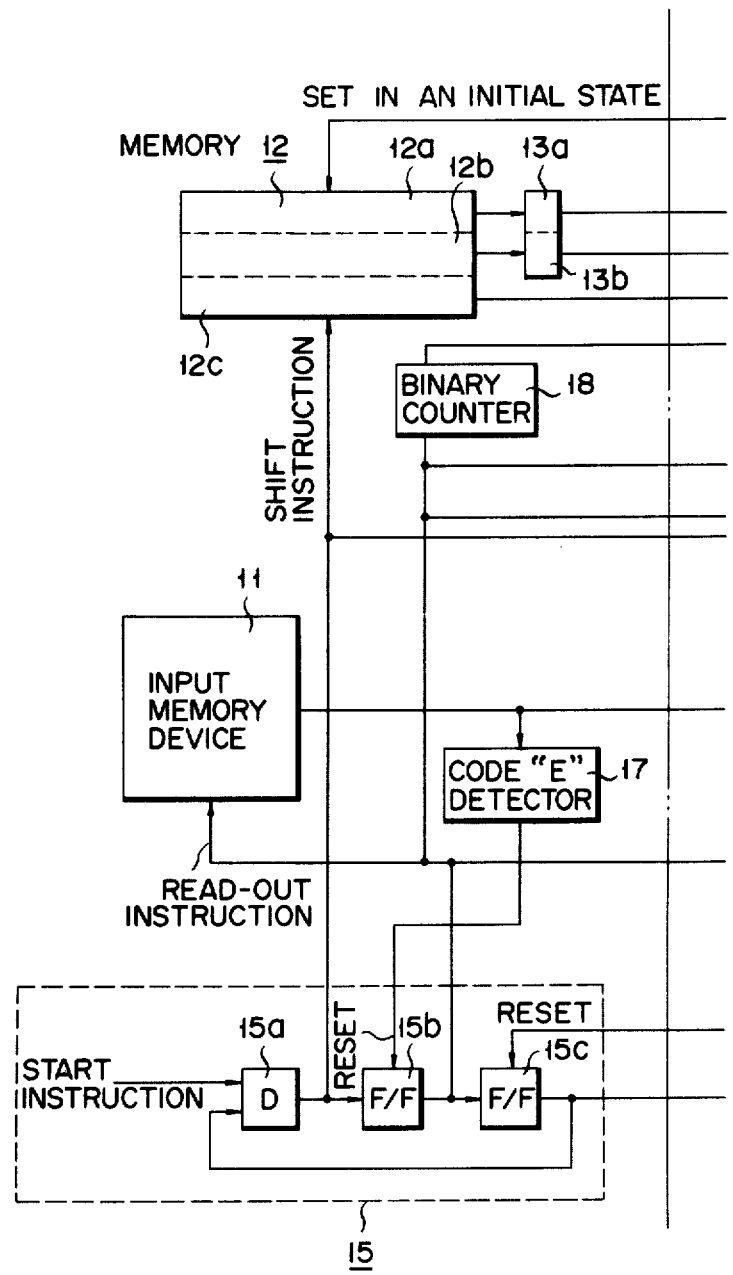
FIG. 5 is a block diagram of a circuit according to another embodiment of the invention for causing a memory to be supplied with an impression data.
Figure 5B:
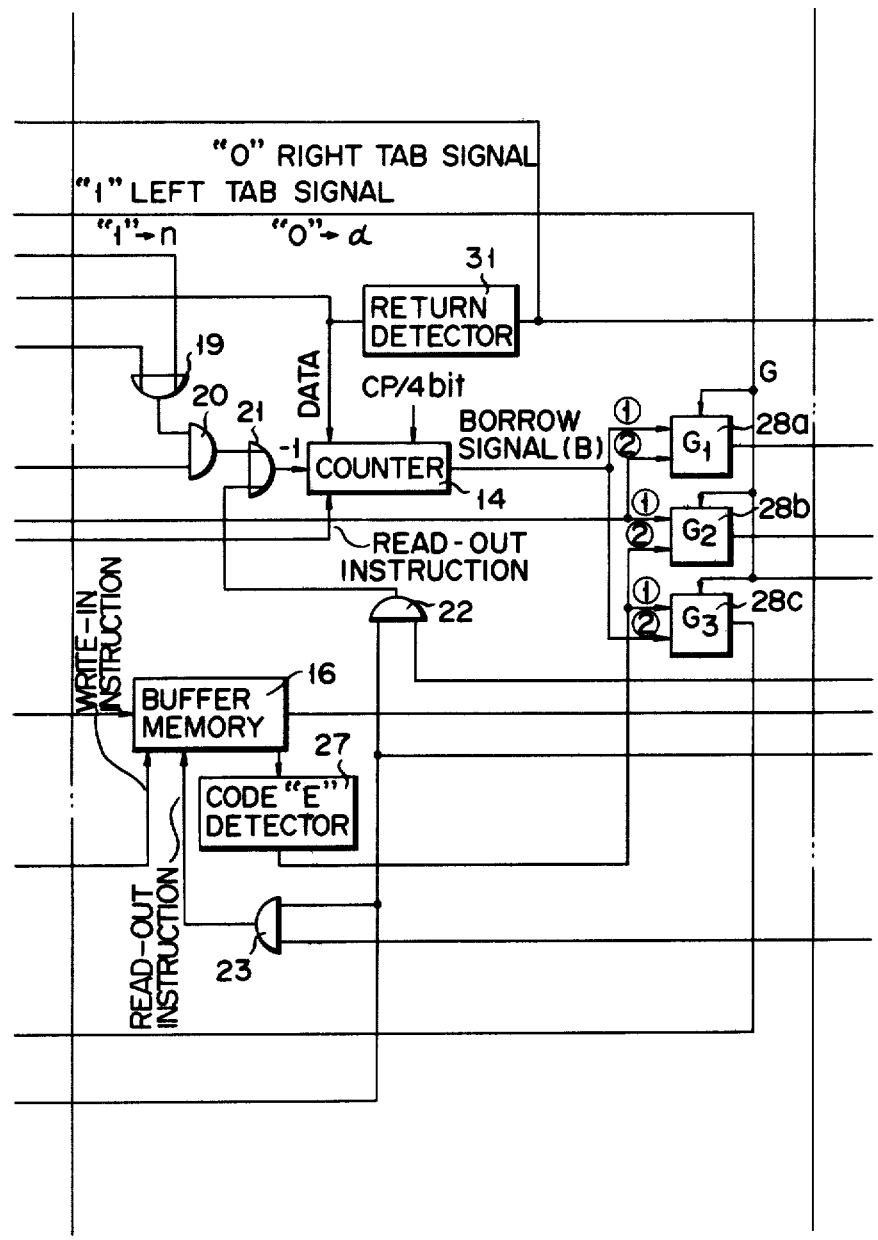
Figure 5C:
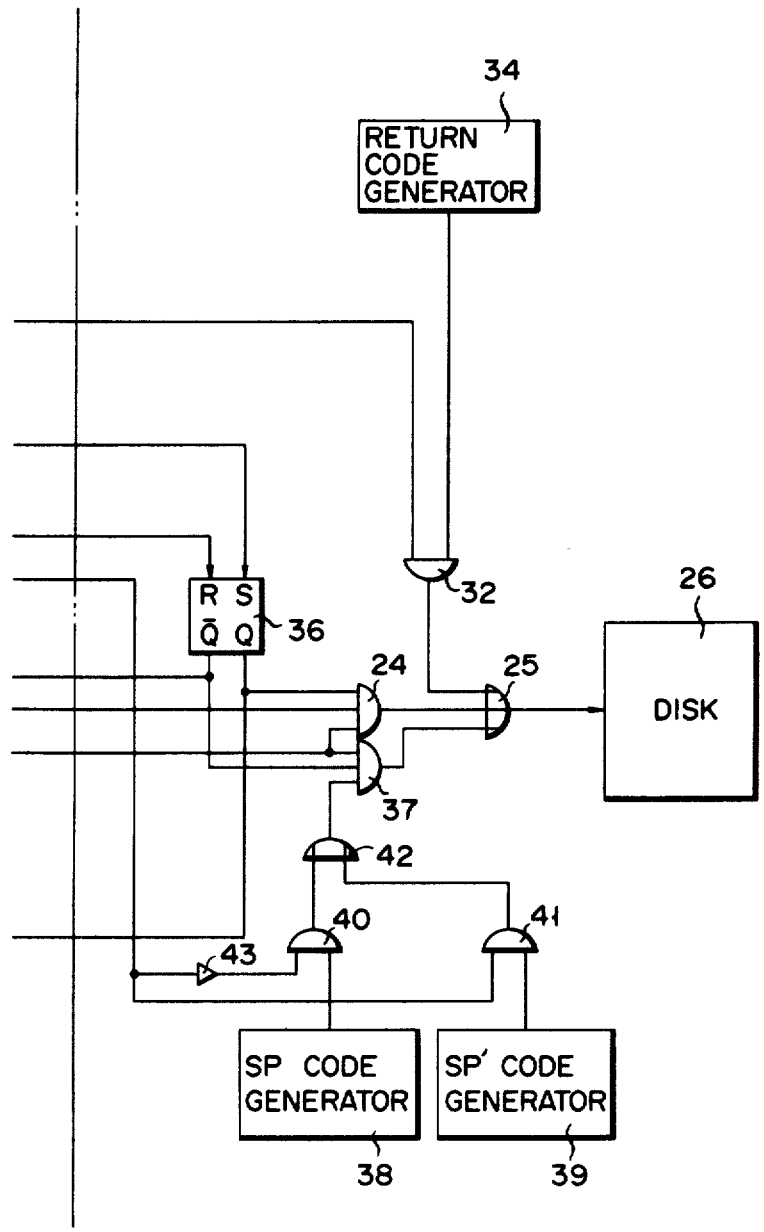

There will now be described by reference to FIG. 5 an impression data-processing apparatus according to another embodiment of this invention. This embodiment comprises not only the aforesaid space code generator 38, but also another space code generator 39 for issuing a new space code SP' for indicating a word data whose components are all formed of 4 bits. The space codes SP, SP' sent forth from the space code generators 38, 39 are drawn out through AND circuits 40, 41 respectively to be supplied to the AND circuit 37 through an OR circuit 42. A left tab data or right tab data delivered from the memory element 13a is supplied as a gate signal to the AND circuit 40 through an inverter 43, and also as a gate signal directly to the AND circuit 41. When the data stored in the memory element 13a is expressed by a binary code of "0", namely, when a letter data is subjected to the left tab arrangement, then a space code sp is let out through the AND circuit 40. When the data stored in the memory element 13a is denoted by a binary code of "1", namely, a digit data is subjected to the right tab arrangement, then a new space code SP' is drawn out through the AND circuit 41. The second embodiment of FIG. 5 has substantially the same arrangement in other respects. Therefore, description is omitted of the delay circuit 29, exclusive OR circuit 30, bit number change-instructing code generator 35 and AND circuit 33 of FIG. 1 which are also used in FIG. 5. If the new space code SP' is applied, a given record data is recorded in the magnetic disk memory 26, for example, in the following format:

aaaSPSPSPSP'SP'PS'nnnn

Thus, a digit data can be processed in a unit of 4 bits simply by detecting the new space code SP'.

According to this invention, a digit data is coded by 4 bits, and a letter digit is coded by 8 bits. An impression data including a sufficient amount of spaces to get ready for impression on a bill is recorded in an impression data memory device such as a magnetic disk memory, whose storing capacity can thus be utilized most effectively.

There will now be described by reference to FIG. 6 a read-controlling device for printing the above-mentioned impression data on a bill. Now it is assumed that an impression data having such a format as illustrated in FIG. 4 is recorded in the magnetic disk memory 26. The recorded impression data is serially read out to an output line 44. The bit-constituted impression data read out of the magnetic disk memory 26 is supplied to a first shift register 45 operated upon receipt of a clock pulse issued in synchronization with the bit-constituted data. In this case, every three serially arranged bits are grouped as a unit. Four bit-constituted data read out in parallel from the bit positions of the first shift register 45 and output line 44 are supplied in parallel to AND circuits 46a to 46d. The code-detecting circuit 47 detects a space code SP. Function code F, thirteen 4-bit code signals representing ten digits (0 to 9) and other notations related thereto, and bit number change-instructing code Ch. An output signal from the third bit position of the shift register 45 is conducted to a second shift register 48 supplied with four serially arranged bits. Data stored in said second shift register 48 are shifted, each time a clock pulse CP is received. The above-mentioned four bit-constituted data read out in parallel are supplied to OR circuits 50a to 50d through AND circuits 49a to 49d. The OR circuits 50a to 50d are supplied through the corresponding AND circuits 51a to 51d with bit-constituted data delivered from the bit positions of the first shift register 45 and output line 44. Eight bits data read out in parallel sent forth from the OR circuits 50a and AND circuits 46a to 46d are conducted to an impression data memory 54 which is formed of eight bit buffer registers 53a to 53h included in an impression data output device 52.

There will now be described by reference to FIG. 7 the arrangement and operation of the code-detecting circuit 47. Four bits datas issued in parallel from the respective bit positions of the first shift register 45 and output line 44 are transmitted to an AND circuit 47a. An output from the second bit position of the first shift register 45 which has been reversed by an inverter 47b and an output from the third bit position of said first shift register 45 which has been reversed by an inverter 47c are supplied to the corresponding AND circuits 47d, 47e. Thus, the AND circuit 47a detects a function code F (1111); the AND circuit 47d detects a space code SP (1101); and the AND circuit 47e detects a bit number change-instructing code Ch (1110). Outputs from the AND circuits 47a, 47d, 47e are conducted to an OR circuit 47f, an output from which is sent forth to an AND circuit 47h through an inverter 47g. Outputs from the AND circuits 47a, 47d, 47e are respectively supplied to one of the input terminals of the corresponding AND circuits 47i, 47j, 47k. The other input terminal of each of the AND circuits 47h, 47i, 47j, 47k is supplied with a clock pulse issued at every fourth bit. Upon receipt of the clock pulse, the AND circuit 47h issues a signal denoting the detection of a code representing a number from 0 to 12; the AND circuit 47i generates a signal indicating the detection of a function code F; the AND circuit 47j produces a signal showing the detection of a space code SP; and the AND circuit 47k gives off a signal signifying the detection of a bit number change-instructing code Ch.

The detection signal of the space code SP delivered from the code-detecting circuit 47 is carried to an OR circuit 55, and also to an AND circuit 57 through an inverter 56. An output from the AND circuit 57 is conducted to an OR circuit 58, an output from which is supplied as a gate signal to the AND circuits 46a to 46d and 49a to 49d, and also to the AND circuits 51a to 51d through an inverter 59. The detection signal of a function code F is delivered to the OR circuits 55, 58 through a 4-bit delay circuit 60, and also to an AND circuit 62 through an inverter 61.

A signal denoting the detection of any of the aforesaid thirteen 4-bit code signals representing ten digits (0 to 9) and other notations related thereto which has been issued from the code-detecting circuit 47 is supplied to an AND circuit 63. A signal showing the detection of the bit number change-instructing code Ch which has been produced from the code-detecting circuit 47 is sent forth as a count instruction to a binary counter 64. An output count signal having a binary code of "1" which has been issued from the binary counter 64 is conducted as a gate signal to the AND circuit 62. Said output count signal of "1" controls the operation of the gates of the AND circuits 57, 63 through an inverter 65. An output from the AND circuit 63 causes a binary counter 66 to commence counting. Outputs from this binary counter 66, OR circuit 55 and AND circuit 62 are supplied as gate signals to an AND circuit 68 through an OR circuit 67. This AND circuit 68 is supplied with a clock pulse CP/4 bits issued at every fourth bit. An output from said AND gate 68 is conducted as a read instruction to the impression data memory 54. The binary counter 64 is reset at the initial stage of the impression data output device 52. The binary counter 66 is reset by an output from the OR circuit 55.

A data denoting any of the thirteen code signals from 0 to 12 is formed of a 4-bit code. A letter data is formed of a combination of two of said thirteen code signals. When a digit data or letter data is read out of the magnetic disk memory 26, then the code-detecting circuit 47 generates a signal denoting the detection of any or combination of said thirteen code signals from 0 to 12. Where, for example, the letter data "OSAKA" of the foremost column (1) is read out of the magnetic disk memory 26 in the following format (FIG. 4),

*aaaaa*SPSP

The AND circuit 63 is supplied with a signal during this reading. At this time, the binary counter 64 is in the initial reset condition and does not generate an output count signal. The binary counter 66 carries out counting upon receipt of an output from the AND circuit 63, each time a letter data is detected by the first shift register 45. Each time 8 bits are read out of the magnetic disk memory 26, namely, each time a data denoting one letter is read out, the contents of the binary counter show the condition expressed by a binary code of "1". A read instruction of a clock pulse is issued from the AND circuit 68.

An impression data detected by the code-detecting circuit is stored in series in the shift registers 45, 48. Since, at this time, the inverters 56, 65 generate an output of "1", an output from the AND circuit 57 is conducted through the OR circuit 58 to the AND circuits 46a to 46d, 49a to 49d. An 8-bit impression data read out from the bit positions of the first and second shaft registers 45, 48 is supplied to the corresponding bit positions 53a to 53h of the impression data memory 54. When an 8-bit letter data is stored in the first and second shift registers 45, 48, then a read instruction of a clock pulse is issued, causing an 8-bit letter data to be written in the impression data memory 54. An impression letter data whose 8-bits are stored in the memory units 53a to 53h of the impression data memory 54 is supplied to a printing device (not shown) through a decoder.

8 bits constituting a letter data are read out in series from the magnetic disk memory 26 for impression of a letter on a bill. When a word data formed of, for example, five letters "OSAKA" and the immediately following two space codes are read out from the magnetic disk memory 26, a signal denoting the detection of said space codes SP is stored in the first shift register 45, and then is detected by the code-detecting circuit 47. At this time, the gate of the AND circuit 57 is closed, preventing the OR circuit from generating an output, and causing the OR circuit 55 to produce an output. As the result, the gates of the AND circuits 46a to 46d, to 49d are closed, and the gates of the AND circuits 51a to 51c are opened. Further, four bits are led out of the AND circuit 68. Accordingly, 4 bits constituting a space code SP are stored in the upper four bit positions or memory units 53a to 53d of the impression data memory 54 through the AND circuits 51a to 51d and OR circuits 50a to 50d. As the result, a space instruction is issued to a printing device (not shown) at an interval of 4-bits, thereby providing a required space for an impression printed on a bill.

Where, as seen from FIG. 4, an impression data immediately following the five 8-bit letter data "OSAKA" is formed of three digit data "123" or in the reverse case, a bit number change-instructing code Ch is inserted between both forms of impression data. When said bit number change instructing code Ch is detected by the code-detecting circuit 47, then the contents of the binary counter 64 are reversed in the binary code, causing an output of "1" to be issued from said binary counter 64. Since, at this time, the inverter 65 does not generate an output, the gate of the AND circuit 63 is closed, and the AND circuit 62 is supplied with a gate signal. Unless a function code F is detected by the code-detecting circuit 47, the gate of the AND circuit 35 is opened upon receipt of an output from the AND circuit 62. Later, an impression data (for example, a digit data) is read out in a unit of 4 bits from the impression data memory 54. Since, at this time, the OR circuit does not send forth an output, the gates of the AND circuits 51a to 51d are opened. 4 bits constituting a digit data are read out in parallel from the bit positions of the shift register 45 to be supplied to the four upper bit positions or memory units 53a to 53d of the impression data memory 54. Namely, 4 bits constituting a digit data read in series out of the magnetic disk memory 26 are supplied to a printing device (not shown) through the impression data memory 54 and a decoder (not shown).

There will now be described the case where a letter data of 8 bits is stored in the impression data memory 54. When the succeeding bit number change-instructing code Ch is read out of the magnetic disk memory 26, the contents of the binary counter 64 are again reversed in the binary code, and an output is produced from said counter 64. Therefore an impression data of 8 bits is stored in the impression data memory 54. An output therefrom is supplied as a printing instruction to a printing device through a decoder for impression of a letter data on a bill.

When bits constituting a record data represented by such a format as indicated in the lower line of FIG. 4 are read out in series from the magnetic disk memory 26, then an instruction is given to a printing device to make an impression illustrated in the upper line of FIG. 4. Eventually, impressions are made on a sheet of recording paper as shown in FIG. 2. Thus, an effective impression-controlling instruction is issued to a printing device such as a line printer.

Figure 8:
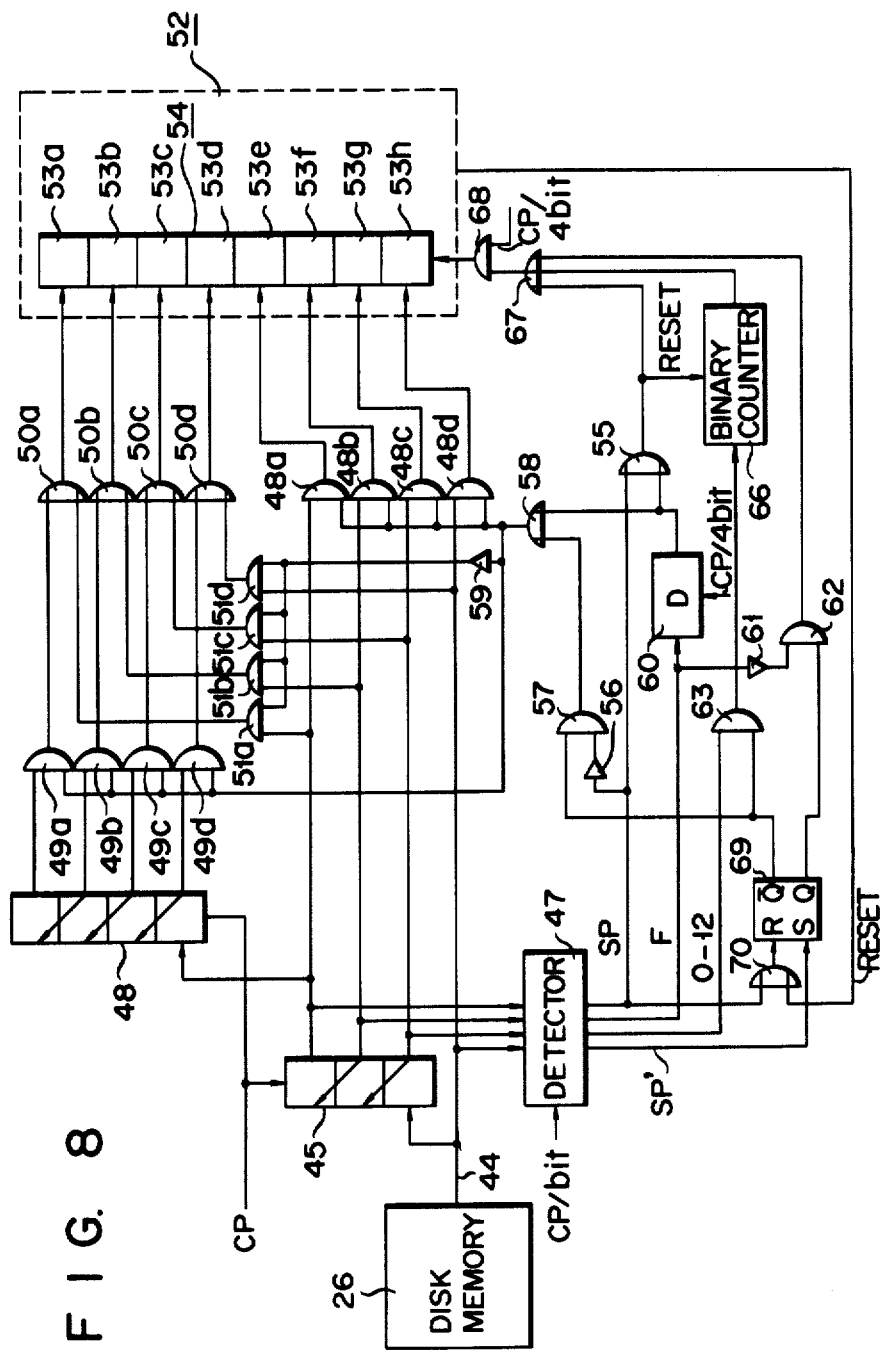
FIG. 8 indicates the arrangement of a circuit for reading out an impression data stored in a memory by the embodiment of FIG. 5.

Control of impression is effected by various forms of function instructions. Each function instruction is formed of a function code F combined with a control code denoting a function instruction. Where the code-detecting circuit 47 detects a function code F, then the delay circuit 60 issues an output 4 bits later than said detection. When the delay circuit 60 generates an output, the function code F is stored in the second shift register 48. The first shift register 45 is supplied with an instruction code immediately following said function code F. At this time, an output from the OR circuit 58 opens the gates of the AND circuits 46a to 46d, 49a to 49d. A gate signal is conducted to the AND circuit 68 through the OR circuits 55, 67. A function control code is written in the impression data memory device 54 to control the function of a printing device (not shown). When the impression instruction generator 52 issues an instruction to stop printing, then the binary counter 64 is brought back to the original reset position.

Where an impression data shown in FIG. 2 is read out of the magnetic disk memory 26 by the circuit arrangement, it is advised to use the circuit arrangement of FIG. 8 modified from that of FIG. 6. Namely, a new space code SP' of 4-bits is detected by the code-detecting circuit 47 in place of the aforesaid bit number change-instructing code Ch. The binary counter 64 is replaced by a flip-flop circuit 69. This flip-flop circuit 69 is set upon detection of the space code SP' by the code-detecting circuit 47, and is reset by an output from an OR circuit 70 which is supplied with the detection signal of a space code SP and a reset instruction issued from the impression instruction generator 52. The flip-flop circuit 69 is reset when a letter data is read out and is set when a digit data is read out. The same operation as in the preceding embodiment can be carried out, if a gate signal is supplied to the AND circuit 62 when the flip-flop circuit 69 is set, and a gate signal is delivered to the AND gates 56, 63 when said flip-flop circuit 69 is reset.

As mentioned above, this invention causes an impression data formed of units of 4 bits effectively used with, for example, the CPU to be recorded in, for example, a magnetic disk memory in the form exactly ready for impression with required 4-bit spaces inserted.

This invention has the advantages that it is unnecessary to change a bit number, for example, causing all impression data including digit data and letter data to be rearranged into 8-bit units; printing can be effected with the variable lengths of words left intact; an impression data is recorded in, for example, a magnetic disk memory in the form capable of being denoted by 4 bits to the best possible extent; and consequently the storing capacity of the magnetic disk memory can be utilized most efficiently.

What is claimed is:

1. An impression data-processing apparatus for reading out of a memory device coded data being impressed on a recording medium which denote numerical data from "0" to "9" and notations related thereto and letter data, wherein the memory device is supplied with a numerical data coded by 4 bits, a letter data coded by a combination of two 4-bit units, a space-instructing data and a judgment data for distinguishing between a digit data and letter data, both space-instructing data and judgment data being constituted by two of those of sixteen codes formable from 4 bits which are not used to indicate either a numerical data or a letter data, and which comprises means for reading said data from the memory device; means for detecting the space-instructing data and judgment data both formed of 4 bits, which have been read out by said reading means; a bit number change-instructing means for detecting the digit and letter data read out of the memory means by the reading means in a unit of 4 bits or a combination of two 4-bit units in accordance with a judgment data sent forth from the detection means; and printing means for carrying out the spacing of a recording medium upon detection of a space-instructing code by the detecting means, and printing a digit or letter on the recording medium upon detection of the corresponding numeral code or letter code by the bit number change-instructing means.

2. An impression data-processing apparatus for reading out of a memory device coded data being impressed on a recording medium which denote ten digits from "0" to "9" and notations related thereto and letter data and printing said data by a printing device, wherein the memory device is supplied with a numeral data coded by 4 bits, a letter data coded by a combination of two 4-bit units and two forms of space-instruction code, one of which indicates that the succeeding coded data is a letter data, and the other of which shows that the succeeding coded data is a digit data, both forms of space-instructing code being constituted by two of those of sixteen codes formable from 4 bits which are not used to denote either a numerical data or a letter data, and which comprises means for reading said data from the memory device; means for detecting both forms of 4-bit space-instructing code which have been read out by the reading means; bit number change-instructing means, which, upon detection of one of both space-instructing codes, detects the succeeding coded data read out of the memory device in a unit of 8 bits, and, upon detection of the other of both space-instructing codes, detects the succeeding coded data read out of the memory device in a unit of 4 bits; and printing means for carrying out the spacing of the recording medium upon detection of the space-instructing code and printing a numeral or letter on a recording medium upon detection of the corresponding digit code or letter code by the bit number change-instructing means.

* * * * *